(12) United States Patent
Patel et al.

(10) Patent No.: US 10,193,740 B1
(45) Date of Patent: Jan. 29, 2019

(54) METHOD AND APPARATUS FOR NOTIFICATION CONTROL

(71) Applicant: MBIT WIRELESS, INC., Irvine, CA (US)

(72) Inventors: Bhaskar Patel, San Clemente, CA (US); Arumugam Govindswamy, Irvine, CA (US)

(73) Assignee: MBIT WIRELESS, INC., Irvine, CA (US)

( * ) Notice: Subject to any disclaimer, the term of this patent is extended or adjusted under 35 U.S.C. 154(b) by 100 days.

(21) Appl. No.: 15/162,789

(22) Filed: May 24, 2016

(51) Int. Cl.
  *H04L 12/24* (2006.01)
  *H04W 4/02* (2018.01)

(52) U.S. Cl.
  CPC ...... *H04L 41/0618* (2013.01); *H04L 41/0622* (2013.01); *H04L 41/0681* (2013.01); *H04W 4/025* (2013.01)

(58) Field of Classification Search
  CPC ............. H04L 41/0618; H04L 41/0622; H04L 41/0681; H04W 4/025
  USPC ......... 455/414.1, 414.2, 414.3, 414.4, 412.1, 455/412.2, 413
  See application file for complete search history.

(56) References Cited

U.S. PATENT DOCUMENTS

| | | | |
|---|---|---|---|
| 2010/0241738 A1* | 9/2010 | Noguchi | H04N 1/00344 709/220 |
| 2010/0273460 A1* | 10/2010 | Dorbie | G06Q 10/109 455/414.1 |
| 2013/0210487 A1* | 8/2013 | Murakami | H04M 1/72569 455/556.1 |
| 2013/0332721 A1* | 12/2013 | Chaudhri | G06F 3/016 713/100 |
| 2016/0150370 A1* | 5/2016 | Gillespie | H04W 4/021 455/456.3 |
| 2016/0157067 A1* | 6/2016 | Capota | H04W 4/12 455/414.1 |
| 2016/0373908 A1* | 12/2016 | Iwai | H04M 3/487 |
| 2017/0302751 A1* | 10/2017 | Yang | H04L 65/105 |

* cited by examiner

*Primary Examiner* — Shahriar Behnamian

(57) ABSTRACT

Modern mobile communication devices have a number of features that enable the users to stay connected with people, stay informed about various local and global events. While these features are useful, they can be intrusive or may cause distraction under some conditions. To reduce the disturbance and intrusion, the various notifications that inform the user about the new events on the mobile device may be temporarily disabled. However, the event notifications must be explicitly re-enabled by the user when it is acceptable to receive the notifications. The user may forget to re-enable the event notification which may lead to missed calls, missed event notifications, etc. A method and apparatus are disclosed that disable and enable the event notifications on the mobile device adaptively depending on the user's location and time to reduce the intrusiveness of the mobile device notification when not required while reducing any missed event notifications.

18 Claims, 5 Drawing Sheets

METHOD AND APPARATUS FOR NOTIFICATION CONTROL

BACKGROUND

The present disclosure relates generally to client terminals and particularly to mobile communication devices.

Mobile communication devices may offer a wide range of functionality beyond basic voice calls. For example, the functionalities may include text messaging, Instant Messenger (IM) based messaging, mobile internet services, etc. In mobile communication devices such as smartphones and tablets, even more functionality is integrated such as email, social networking, maps and navigation, and many other applications. In the present disclosure, the terms client terminal, user terminal, user equipment, smartphone, mobile, mobile device or tablet are used interchangeably. The various functionalities at the application level may be supported by different underlying wireless technologies. For example, the mobile communication capability for voice call and internet may be provided by a Long Term Evolution (LTE) system of $3^{rd}$ Generation Partnership Project (3GPP). Alternatively, Wireless Local Area Network (WLAN), also commonly known as Wi-Fi, based on the Institute of Electrical and Electronics Engineers (IEEE) 802.11 family standards may be used for wireless communication. A client terminal may also have a receiver for a Global Positioning System (GPS) for location determination. A client terminal may have other technologies for location determination such as Observed Time Difference of Arrival (OTDOA), Angle of Arrival (AoA), etc. The location information may be expressed in terms of latitude and longitude coordinates. A client terminal may use other technologies to enable the wireless communication capability.

The increased functionality of client terminals has led to a common scenario where users are connected to their contacts and to the local, regional, and global events almost all the time. Any event update by any of the applications running in a client terminal may be notified to a user in different ways such as an audible incoming call ringing sound, vibrations, notification beeps and other sounds, flashing display, etc. The various methods of notifying an event to a user are collectively referred herein as event notification alerts. As users carry their client terminals with them to many places, there is a greater need for minimizing the disturbance due to the event notification alerts. For example, when going to any quiet place such as a library, an office, an auditorium, a movie theatre, etc., it may be required to disable, at least partially, the notification of various events such as incoming calls, text messages, emails, voice mails, social networking updates, etc. In some cases, even the non-audible alerts such as vibration or flashing display may not be acceptable. Many users keep their client terminals near them when they go to sleep. It may be undesirable to provide any type of alert when a user is resting.

While manually turning on and off the event notification alerts may work, it may be tedious to have to do that multiple times every day. Furthermore, the user may forget to turn on or off the event notification alerts. Conventional client terminals offer capability to disable event notification alerts. The disabling can be done at different levels such as no audible alerts but vibration alerts may be allowed or completely silent but the display may light when an event requiring notification alert occurs, etc. A shortcoming of the conventional methods is that often users do not remember to disable the event notification alerts or to re-enable the event notification alerts or turn the mobile device back on after they leave quiet public places or when they wakeup. This may lead to disturbance in case of not disabling event notification alerts or, if not re-enabling event notification alerts, it may lead to missed phone calls, delayed response to text messages, and other missed events or delayed response to events. This may cause variety of problems due to disturbance caused to others, or problems for the user depending on the nature of the calls or text messages that may be missed or responded with delay.

SUMMARY

A method and apparatus are disclosed that enable a client terminal to autonomously disable or enable event notification alerts as per user preferences and the user preferences may be automatically learned and trained over time. This may lead to an improved user experience with reduced missed calls and event notifications while minimizing the disturbance from undesirable event notification alerts.

In accordance with an aspect of the present disclosure, a method for notification control at a client device in a wireless communication system may include controlling, by a processing device, automatically storing, in a memory of the client device, an event notification preference entry based on user action to change at least one event notification alert setting, in which the event notification preference entry indicates location of the client device at a time of the user action and user alert preference information indicating the change to the at least one event notification alert setting, and based on a determination whether a current location of the client device matches a given location identifier indicated by a given event notification preference entry in the memory, automatically enabling and disabling event notification alerting according to the given event notification preference information entry.

In one alternative, the automatically storing the event notification preference entry in the memory and the automatically enabling and disabling the event notification alerting may be according to user input via an interface of the client device.

In one alternative, the event notification preference entry may indicate the time of the user action, and the automatically enabling and disabling the event notification alerting may be further based on a determination whether a time when the client device is at the current location matches a given time indicated by the given event notification preference entry.

In one alternative, the location of the client device may be indicated in the event notification preference entry by at least one of a Base Station Identity (BSID), a Basic Service Set Identification (BSSID) of an Access Point for a Wireless Local Area Network (WLAN) or a coordinate.

In one alternative, the method may include controlling, by the processing device, when a predetermined number of event notification preference entries are stored in the memory, starting the automatically enabling and disabling of the event notification alerting.

In one alternative, the method may include controlling, by the processing device, when (i) the client device is determined to move from a first location to a second location based on a first location identifier of the first location and a second location identifier of the second location, (ii) the event notification alerting is according to a first notification preference entry in the memory indicating the first location and (iii) the second location identifier matches the given location identifier indicated by the given event notification preference entry, changing the event notification alerting to be according to the given event notification preference entry.

In one alternative, the second location identifier may be determined to match the given location identifier when a plurality of second location identifier types indicated by the second location identifier matches a respective plurality of given location identifier types indicated by the given location identifier.

In one alternative, the given location identifier may indicate at least one of a Base Station Identity (BSID) or a Basic Service Set Identification (BSSID) of an Access Point for a Wireless Local Area Network (WLAN).

In one alternative, the method may include controlling, by the processing device, after the event notification preference entry is automatically stored in the memory, changing the user alert preference information indicated by the event preference notification entry, according to user input via an interface of the client device.

In one alternative, when the given event notification preference entry includes a location information type as latitude and longitudinal coordinates obtained from at least one of Global Positioning System (GPS), Observed Time Difference of Arrival (OTDOA) or Angle of Arrival (AoA), the current location of the client device may be determined to be in a same location as a location indicated in the given event notification preference entry when the current location is within a predetermined radius of the latitude and longitudinal coordinates.

In one alternative, second information of the event notification preference entry may indicate a first event notification alert setting for a first notification alert to be provided during the event notification alerting, according to at least one of a source or a predetermined priority of the first notification alert.

In one alternative, the method may include controlling, by the processing device, changing the user alert preference information indicated by the event notification preference entry to second user alert preference information according to a message from a scheduler tool, in which the message indicates time of a meeting and whether meeting is onetime or recurring, and changing the second user alert preference information indicated by the event notification preference entry to the first event notification preference information when an end of the meeting is determined.

In one alternative, at least one given event notification preference entry may be at least one of (i) selectable for deletion from the memory based on user input via an interface of the client device or (ii) automatically deleted from the memory according to whether the at least one given event notification preference entry is in the memory for greater than a predetermined time.

In accordance with an aspect of the present disclosure, an apparatus for notification control at a client device in a wireless communication system may include circuitry configured to control: automatically storing, in a memory of the client device, an event notification preference entry based on user action to change at least one event notification alert setting, in which the event notification preference entry indicates location of the client device at a time of the user action and user alert preference information indicating the change to the at least one event notification alert setting, and based on a determination whether a current location of the client device matches a given location identifier indicated by a given event notification preference entry in the memory, automatically enabling and disabling event notification alerting according to the given event notification preference information entry.

In one alternative of the apparatus, the automatically storing the event notification preference entry in the memory and the automatically enabling and disabling the event notification alerting may be according to user input via an interface of the client device.

In one alternative of the apparatus, the event notification preference entry may indicate the time of the user action, and the automatically enabling and disabling the event notification alerting may be further based on a determination whether a time when the client device is at the current location matches a given time indicated by the given event notification preference entry.

In one alternative of the apparatus, the location of the client device is indicated in the event notification preference entry by at least one of a Base Station Identity (BSID), a Basic Service Set Identification (BSSID) of an Access Point for a Wireless Local Area Network (WLAN) or a coordinate.

In one alternative of the apparatus, the circuitry may be configured to control, when a predetermined number of event notification preference entries are stored in the memory, starting the automatically enabling and disabling of the event notification alerting.

In one alternative of the apparatus, the circuitry may be configured to control when (i) the client device is determined to move from a first location to a second location based on a first location identifier of the first location and a second location identifier of the second location, (ii) the event notification alerting is according to a first notification preference entry in the memory indicating the first location and (iii) the second location identifier matches the given location identifier indicated by the given event notification preference entry, changing the event notification alerting to be according to the given event notification preference entry.

In accordance with an aspect of the present disclosure, a wireless communication device may include a receiver to receive a signal of a wireless communication system; and a processing device configured for notification control at the wireless communication device. The processing device may be configured to control: automatically storing, in a memory of the wireless communication device, an event notification preference entry based on user action to change at least one event notification alert setting, in which the event notification preference entry indicates location of the wireless communication device at a time of the user action and user alert preference information indicating the change to the at least one event notification alert setting, and based on a determination whether a current location of the wireless communication device matches a given location identifier indicated by a given event notification preference entry in the memory, automatically enabling and disabling event notification alerting according to the given event notification preference information entry.

DETAILED DESCRIPTION

Figure 1:
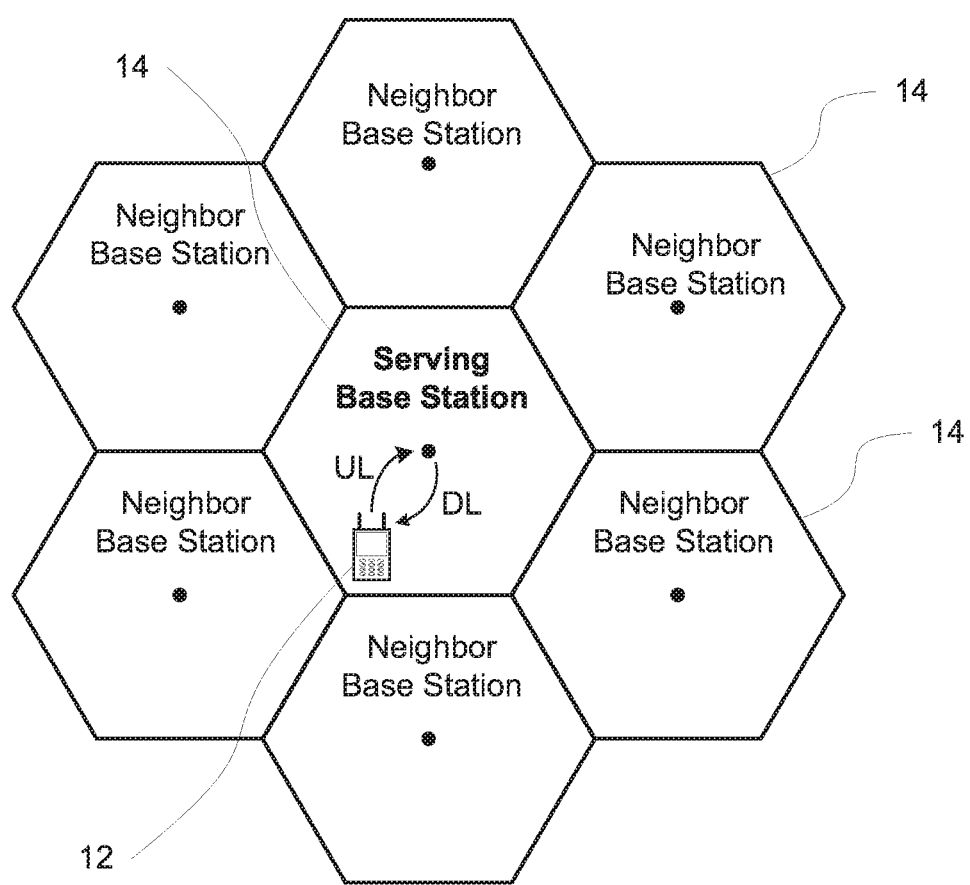
FIG. 1 illustrates a conventional wireless cellular communication system.

The foregoing aspects, features and advantages of the present disclosure will be further appreciated when considered with reference to the following description of exemplary embodiments and accompanying drawings, wherein like reference numerals represent like elements. In describing the exemplary embodiments of the disclosure illustrated in the appended drawings, specific terminology will be used for the sake of clarity. However, the disclosure is not intended to be limited to the specific terms used.

A method and apparatus are disclosed that provide a means to automatically disable the event notification alerts and automatically re-enable the event notification alerts depending on the time and location of the user. According to an aspect of the present disclosure, over time, a client terminal may automatically learn a set of preferences about when and where to enable or disable the client terminal event notification alerts based on user actions. According to an aspect of the present disclosure, a client terminal comprises an Event Notification Alerts Learning and Control (ENALC) module. The ENALC may present an interface to the user to configure the details of operation of the ENALC. The ENALC may comprise a database for storing all the information about the time, location, and selected user preferences for the event notification alerts. The user may enable the ENALC to operate in an autonomous mode for learning and controlling the event notification alerts based on user actions regarding changes to the event notification alerts.

Typically, as shown in FIG. 1, a wireless communication system 10 comprises elements such as client terminal or mobile station 12 and base stations 14. Other network devices which may be employed, such as a mobile switching center, are not shown. In some wireless communication systems there may be only one Base Station (BS) and many client terminals while in some other communication systems such as cellular wireless communication systems there are multiple base stations and a large number of client terminals communicating with each base station.

As illustrated, the communication path from a base station to a client terminal direction is referred to herein as the downlink (DL) and the communication path from a client terminal to a base station direction is referred to herein as the uplink (UL). In some wireless communication systems the client terminal or Mobile Station (MS) communicates with the BS in both DL and UL directions. For instance, this is the case in cellular telephone systems. In other wireless communication systems the client terminal communicates with the base stations in only one direction, usually the DL. This may occur in applications such as paging.

The base station from which the client terminal is receiving service is referred to as the serving base station. In some wireless communication systems the serving base station is normally referred to as the serving cell. While in practice a cell may include one or more base stations, a distinction is not made between a base station and a cell, and such terms may be used interchangeably herein. The base stations that are in the vicinity of the serving base station are called neighbor cell base stations. Similarly, in some wireless communication systems a neighbor base station is normally referred as a neighbor cell.

When the ENALC is started for the first time, it may not have any information about when and where to enable or disable the event notification alerts. According to an aspect of the present disclosure, after configuring the ENALC to operate in autonomous mode, when for the first time the user makes changes to the event notification alerts, the ENALC logs that information (details of the changes to the event notification alerts) in its database and associates it with the time and particular location at which the change of the event notification alerts is done by the user. The process of associating the change of the event notification alerts with the time and location is referred herein as time stamping and location stamping respectively. According to an aspect of the present disclosure, the location of the client terminal may be of different types such as Base Station Identity (BSID) in case of a wireless communication network, the Basic Service Set Identification (BSSID) of an Access Point in case of a WLAN, or the latitude and longitude coordinates of the location which may be obtained from a GPS receiver or other location determination methods in a client terminal. Subsequently, the ENALC may continue to log the changes to the event notification alerts as and when the user makes those changes.

After a period of time the ENALC may have a number of entries in its database containing the time and locations where the user made changes to the event notification alerts. According to an aspect of the present disclosure, when the ENALC has a number of entries that exceeds a configurable number N, it may start controlling the event notification alerts based on the previously logged changes made by the user. The value of the parameter N, for example, may be 25. The location type used by the ENALC may be, for example, the Base Station Identity (BSID) of a wireless communication network. According to an aspect of the present disclosure, as and when the client terminal moves from one cell to another, the BSID of each selected cell may be monitored. The ENALC searches its database and if the BSID of the current serving cell matches the BSID in one of the entries in the database, the event notification alerts may be configured to the settings in the corresponding entry in the database. Similarly, for example, the location type used by the ENALC may be the BSSID of a WLAN. As the client terminal moves from coverage of one WLAN to another WLAN, the BSSID of each WLAN may be monitored. The ENALC searches its database and if the BSSID of a WLAN to which the client terminal is connected matches the BSSID in one of the entries in the ENALC, the event notification alerts are configured to the settings in the corresponding entry in the database. According to an aspect of the present disclosure, the ENALC may use multiple location identifier types to log the changes made to the event notification alerts by the user. For example, the ENALC may use both the BSID of a wireless communication network and BSSID of a WLAN. According to an aspect of the present disclosure, the ENALC may make changes to the event notification alerts if both the BSID and BSSID location identifiers in the database match with the current serving cell BSID and the BSSID from which the client terminal may be getting service.

A typical use case is illustrated next. A user may wakeup in morning at a certain time and may enable all the event notification alerts. After few hours when the user reaches office, the user may disable the audible and visual event notification alerts and may enable only the vibration based event notification alert. When the user leaves the office, the user may re-enable all the event notification alerts for voice calls and may disable any event notification alerts for email, text messages, or any other social network messages. Eventually when the user reaches home, the user may enable all event notification alerts for all types of events. Finally, when the user goes to sleep, the user may disable all event notification alerts except for morning wakeup alarm. The user may follow a different daily pattern during weekdays and weekends. During weekend, if the user visits a museum, a library or a theatre, the user may disable all the event notification alerts and may re-enable all the event notification alerts when leaving those places. Therefore, the ENALC may log the day of the week, date, and time along with the location information whenever the user makes any change to the event notification alerts.

After the user has made manual changes to the event notification alerts for some time, for example several days, as part of normal usage, the ENALC builds up and trains the database of the user preferences and associates them with the time and location of those changes. According to an aspect of the present disclosure, the ENALC applies those changes to the event notification alerts as and when the user goes to or passes through those locations. According to an aspect of the present disclosure, the user may continue to make manual changes to the event notification alerts and the ENALC may continue to add new entries to its database and train the database. According to an aspect of the present disclosure, the user may override any autonomous changes made to the event notification alerts by the ENALC. According to an aspect of the present disclosure, for a location that is already in the database of the ENALC, if the user makes a different selection of event notification alerts, the ENALC may overwrite the previously logged information for that location with the new information as per the changes made by the user.

According to an aspect of the present disclosure, if the location information type is latitude and longitude coordinates obtained using GPS, OTDOA, AoA, etc., then the ENALC may consider the client terminal to be in the same location as the saved latitude and longitude coordinates in the database if its current location is within a certain configurable radius of the saved latitude and longitude coordinates in the database. For example, the radius may be configured to be 50 meters.

According to an aspect of the present disclosure, the ENALC may be configured to perform the autonomous changes to the event notification alerts based on only the location information or it may make the changes based on location and time information. According to another aspect of the present disclosure, ENALC may be configured to use additional triggers for making changes or exceptions to the event notification alerts. For example, notifications from certain users may be always allowed or emails marked with higher priority may always be allowed, etc.

According to an aspect of the present disclosure, the ENALC may be configured to receive a message from meetings and appointments scheduler tool such as Microsoft Outlook, or any other scheduling tool. According to an aspect of the present disclosure, whenever a user accepts or schedules a meeting, the ENALC may receive a message from the scheduler tool with the information about the time and date of the meeting. It may also include an indication of whether it is a onetime meeting or a recurring meeting. According to an aspect of the present disclosure, based on the received message from a scheduler tool, the ENALC may change the event notification alerts as per user preference. At the end of the meeting duration, the ENALC may change the event notification alerts back to the normal settings for that location and current time.

According to an aspect of the present disclosure, the ENALC may allow the user to clear the contents of its database. The ENALC may allow the user to clear the database in its entirety or selectively. The user may decide to clear the database contents in order to reduce the size of the database or to remove erroneous entries. The ENALC may be configured to automatically remove entries that are older than a certain configurable duration, for example, one year. According to an aspect of the present disclosure, the ENALC may allow the user to retrain the database.

Figure 2:
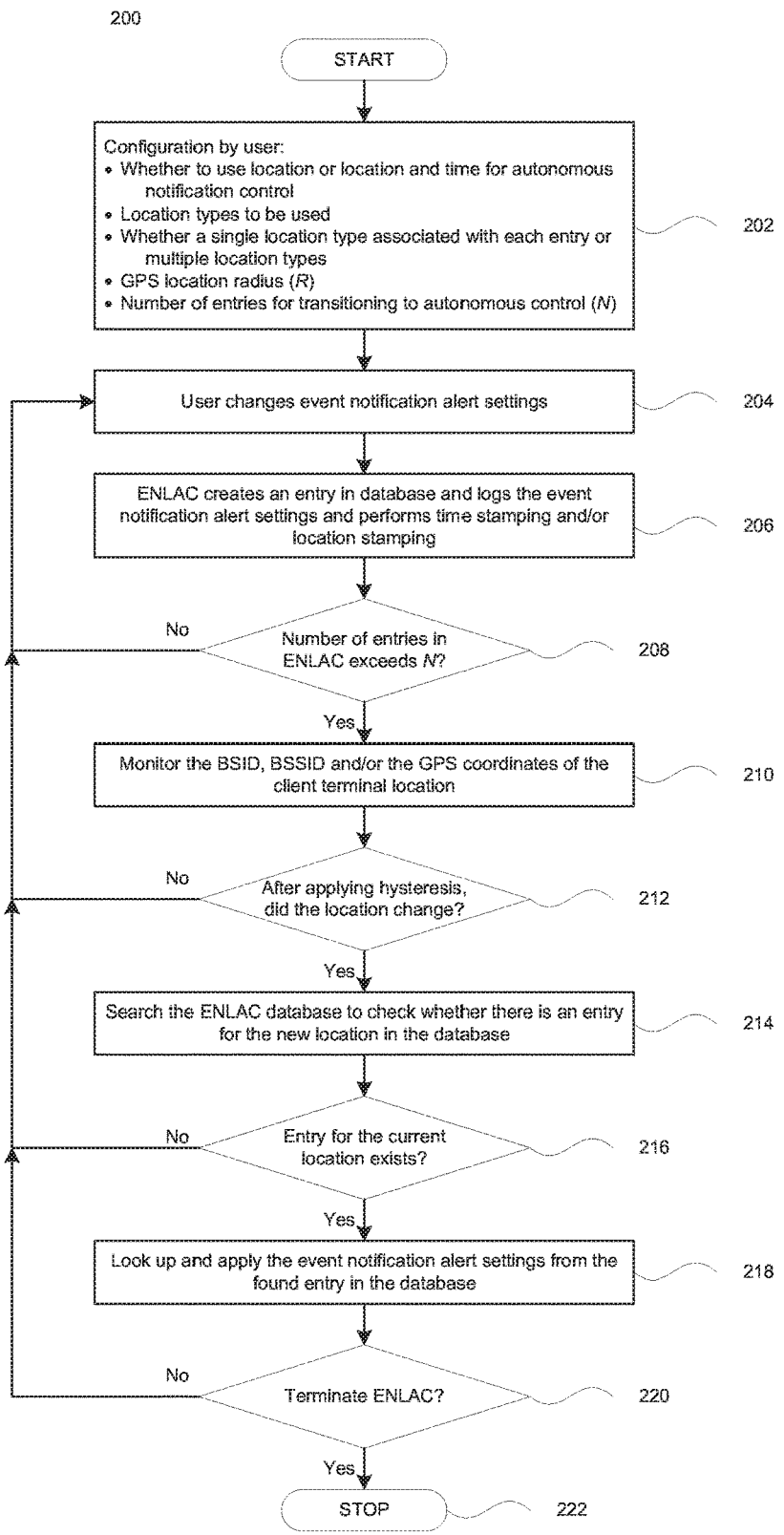
FIG. 2 illustrates an exemplary flow chart for the processing steps in accordance with the aspects of the present disclosure.

By way of example only, the flow diagram 200 contained in FIG. 2 illustrates processing steps according to various aspects of the present disclosure. At processing stage 202, the configurable parameters for the ENALC may be initialized. The ENALC may have default configuration as follows: use both location stamping and time stamping for autonomous event notification alerts control, use location information from any available source such as BSID, BSSID or latitude and longitude coordinates for logging entries in the database, associate a single location type with each entry, the latitude and longitude location radius R=50 meters and the number of entries N=25 for transitioning to autonomous event notification alerts control. The default values of parameters may be reconfigured by the user. At processing stage 204, the user may make changes to event notification alert settings. At processing stage 206, ENALC creates an entry in the database and logs the current event notification alert settings along with the location or both location and time if either location stamping alone or both location stamping and time stamping are configured. At processing stage 208, the ENALC checks whether the number of entries in its database exceeds the configured value of the parameter N. If the number of entries does not exceed N, the processing returns to the processing stage 204. If the number of entries exceeds N, the processing continues at processing stage 210. At processing stage 210, the ENALC monitors the current location of the client terminal as the user continues normal usage of the client terminal. As and when the client terminal gets service from different mobile network base stations or WLAN Access Points at different locations, at processing stage 212, the ENALC compares the current location such as BSID, BSSID, and/or latitude and longitude coordinates with the previous location where the client terminal had received service. If the location did not change, the processing returns to the processing stage 204. In case the location type used is latitude and longitude coordinates, the location of the client terminal is considered to be the same if the new coordinates are within the configured radius R of its current location within a certain amount of time, such as one minute. If the location did change, then the processing continues at processing stage 214 where the ENALC compares the new location with all the entries in the database. At processing stage 216, a determination is made whether a matching entry for the new location exists in the database or not. If a matching entry does not exist, the processing returns to the processing stage 204. If a matching entry does exist in the database, the processing continues at processing stage 218 where the event notification alert settings from the matched entry in the database are extracted and applied to the current event notification alerts settings of the client terminal. The ENALC may provide indication to the user that the event notification alert settings have changed. At processing stage 220, ENALC checks whether the user decides to terminate ENALC or not. If ENALC is not terminated, the processing returns to stage 204. Otherwise the processing suitably terminates at stage 222.

According to another aspect of the present disclosure, the autonomous event notification alerts control may employ hysteresis to avoid switching between different settings for the event notification alerts when a client terminal is at the boundary of two cells or boundary of two locations which may be associated with different event notification alerts settings. The hysteresis effect may be achieved using different methods. For example, a timer may be used to track how long a client terminal is staying in the coverage of the same BSID or the same general area as identified by location coordinates. If a client terminal is in the coverage of the same BSID or remains in the same area for a configurable period of time, only then any decision using autonomous event notification alerts control may be made. According to another aspect of the present disclosure, the timer duration for hysteresis may be configurable.

By way of example only, the above-described method may be implemented in a client terminal as a software program, referred herein as an application. As such the application may be included in the non-volatile memory, such as Read Only Memory (ROM) or Flash, of the client terminal by its manufacturer as part of its baseline features. Alternatively, a user may be able to download and install the application from a portal at some later point in time. The downloaded application may be stored in the non-volatile memory of the client terminal.

By way of example only, the above-described method may be implemented in a receiver, e.g., a user device such as a wireless mobile station ("MS") 12 as shown in FIG. 1.

Figure 3:
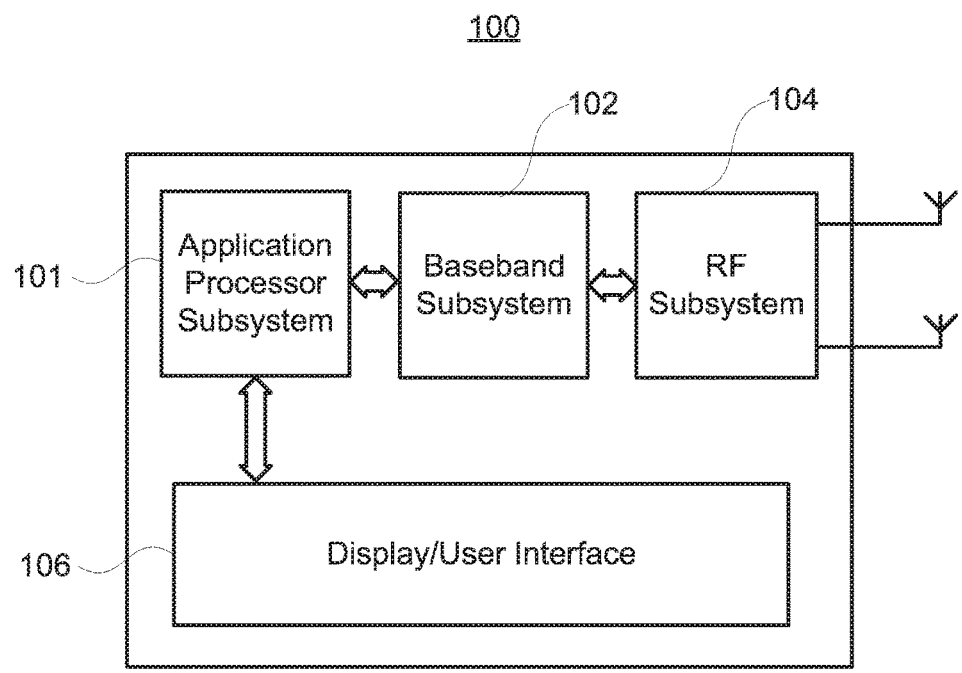
FIG. 3 illustrates a wireless mobile station diagram, which may be employed with aspects of the disclosure described herein.

As shown in FIG. 3, MS 100 may include an application processor subsystem 101, baseband subsystem 102 and a radio frequency ("RF") subsystem 104 for use with a wireless communication network. A display/user interface 106 provides information to and receives input from the user. By way of example, the user interface may include one or more actuators, a speaker and a microphone. In some mobile devices, certain combination of the application processor subsystem 101, the baseband subsystem 102 and the RF subsystem 104 are all integrated as one integrated chip.

Figure 4:
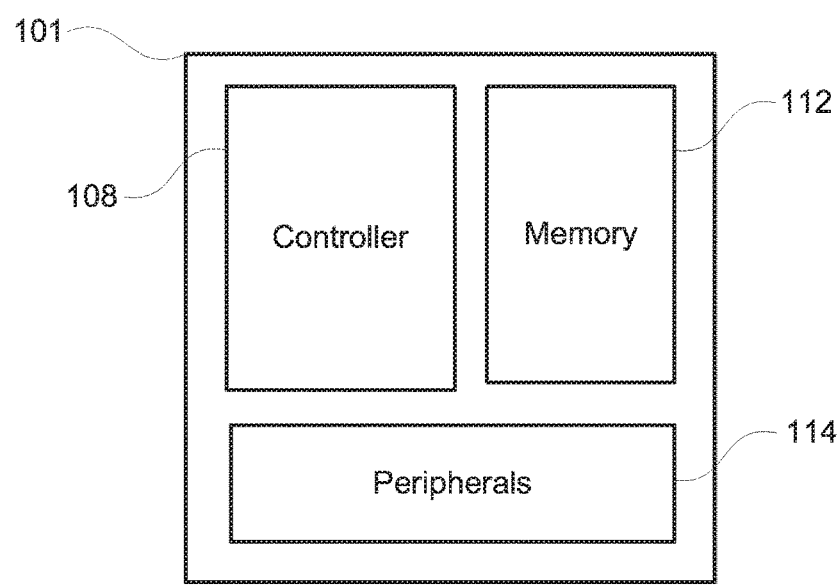
FIG. 4 illustrates an application processor subsystem for a wireless mobile station, which may be employed with aspects of the disclosure described herein.
Figure 5:
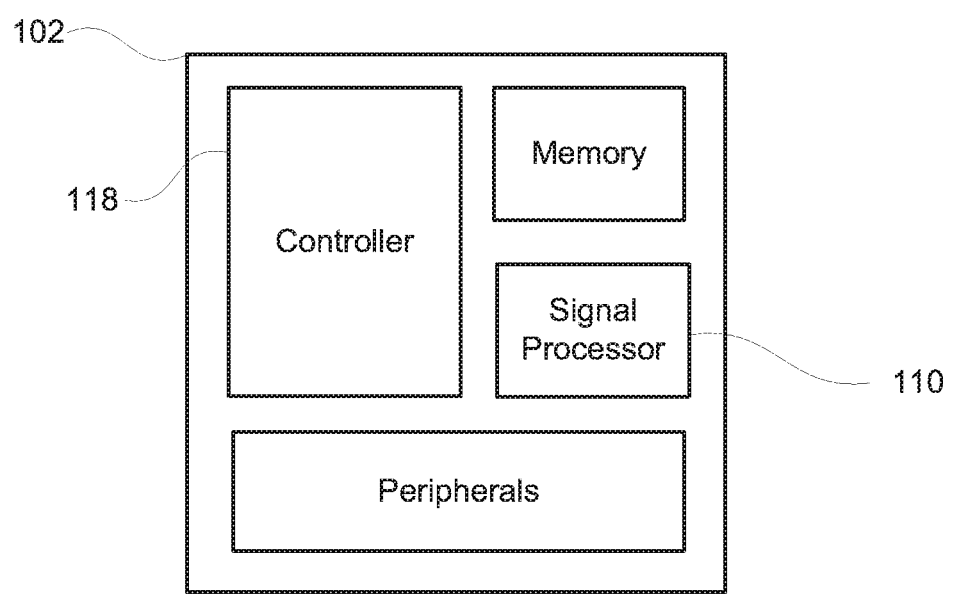
FIG. 5 illustrates a baseband subsystem for a wireless mobile station, which may be employed with aspects of the disclosure described herein.
Figure 6:
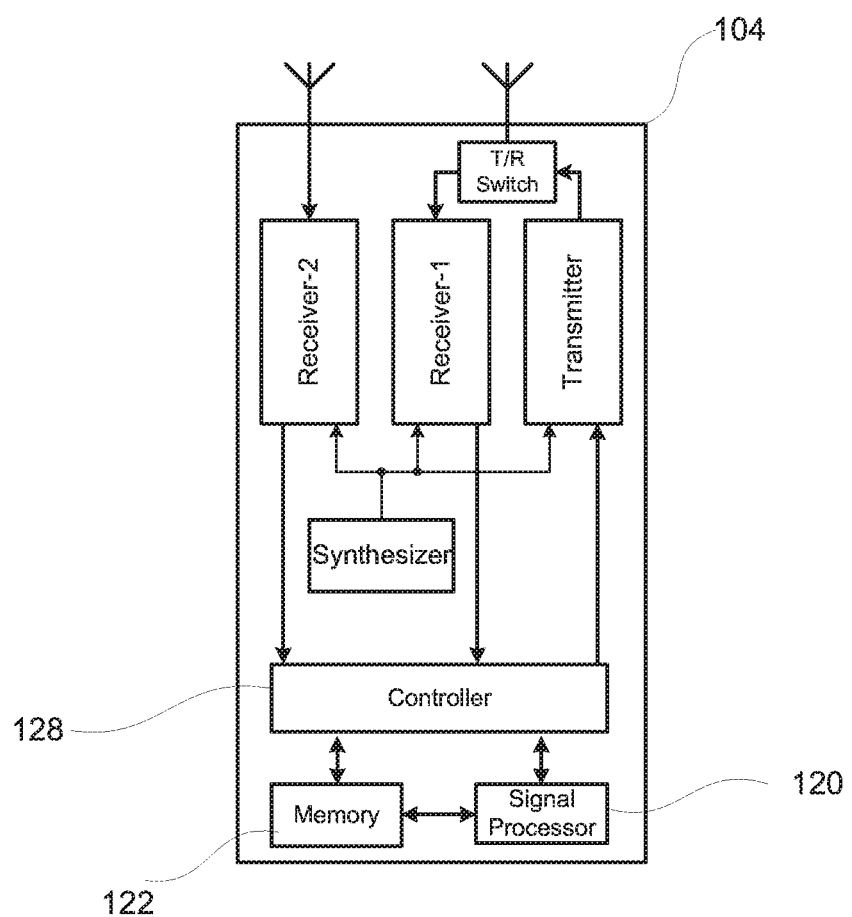
FIG. 6 illustrates a Radio Frequency (RF) subsystem for a wireless mobile station, which may be employed with aspects of the disclosure described herein.

The application processor subsystem 101 as shown in FIG. 4 may include a controller 108 such as a microcontroller or other processor. The baseband subsystem 102 as shown in FIG. 5 may include a controller 118 such as a microcontroller or other processor. The RF subsystem 104 as shown in FIG. 6 may include a controller 128 such as a microcontroller or other processor. The controller 108 desirably handles overall operation of the MS 100. This may be done by software or firmware running on the controller 108. Such software/firmware may embody any methods in accordance with aspects of the present disclosure.

Peripherals 114 such as a full or partial keyboard, video or still image display, audio interface, etc may be employed and managed through the controller 108.

Aspects of the present disclosure may be implemented in firmware of the controller 108 of the application processor and/or the controller 118 of the baseband subsystem. In another alternative, aspects of the present disclosure may also be implemented as a combination of firmware and hardware of the application processor subsystem 101 and/or the baseband subsystem 102. For instance, a signal processing entity of any or all of the FIG. 5 may be implemented in firmware, hardware and/or software. It may be part of the baseband subsystem, the receiver subsystem or be associated with both subsystems. In one example, the controller 118 and/or the signal processor 110 may include or control the protocol entity circuitry. The software may reside in internal or external memory and any data may be stored in such memory. The hardware may be an application specific integrated circuit ("ASIC"), field programmable gate array ("FPGA"), discrete logic components or any combination of such devices. The terms controller and processor are used interchangeably herein.

Although the disclosure herein has been described with reference to particular embodiments, it is to be understood that these embodiments are merely illustrative of the principles and applications of the present disclosure. It is therefore to be understood that numerous modifications may be made to the illustrative embodiments and that other arrangements may be devised without departing from the spirit and scope of the present disclosure as defined by the appended claims. Aspects of each embodiment may be employed in the other embodiments described herein.

The invention claimed is:

1. A method for notification control at a client device in a wireless communication system, the method comprising:
   controlling, by a processing device,
   automatically storing, in a memory of the client device, a given event notification preference entry based on user action to change at least one event notification alert setting,
   in which a location of the client device and a time of day and day when the at least one event notification alert setting is changed by the user action are automatically obtained other than from user input via an interface of the client device and associated with the given event notification preference entry, in which the given event notification preference entry indicates user alert preference information indicating the change to the at least one event notification alert setting;
   based on a determination whether a current location of the client device matches a given location identifier indicated by a first given event notification preference entry of a plurality of given event notification preference entries stored in the memory, automatically enabling and disabling event notification alerting according to the first given event notification preference information entry; and
   when a number of the plurality of given event notification preference entries stored in the memory is determined to be at least a predetermined number, starting the automatically enabling and disabling of the event notification alerting.

2. The method of claim 1,
   wherein the automatically storing the given event notification preference entry in the memory and the automatically enabling and disabling the event notification alerting are according to given user input via the interface of the client device.

3. The method of claim 1, wherein the automatically enabling and disabling the event notification alerting is further based on a determination whether a time of day and day when the client device is at the current location matches a given time of day and given day indicated by the first given event notification preference entry.

4. The method of claim 1,
   wherein the location of the client device is indicated in the given event notification preference entry by at least one of a Base Station Identity (BSID), a Basic Service Set Identification (BSSID) of an Access Point for a Wireless Local Area Network (WLAN) or a coordinate.

5. The method of claim 1,
controlling, by the processing device, when
(i) the client device is determined to move from a first location to a second location based on a first location identifier of the first location and a second location identifier of the second location, (ii) the event notification alerting is according to a first notification preference entry in the memory indicating the first location and (iii) the second location identifier matches the given location identifier indicated by the first given event notification preference entry,
changing the event notification alerting to be according to the first given event notification preference entry.

6. The method of claim 5, wherein the second location identifier is determined to match the given location identifier when a plurality of second location identifier types indicated by the second location identifier matches a respective plurality of given location identifier types indicated by the given location identifier.

7. The method of claim 5,
wherein the given location identifier indicates at least one of a Base Station Identity (BSID) or a Basic Service Set Identification (BSSID) of an Access Point for a Wireless Local Area Network (WLAN).

8. The method of claim 1, further comprising:
controlling, by the processing device, after the given event notification preference entry is automatically stored in the memory, changing the user alert preference information indicated by the given event preference notification entry, according to given user input via the interface of the client device.

9. The method of claim 1,
wherein, when the first given event notification preference entry includes a location information type as latitude and longitudinal coordinates obtained from at least one of Global Positioning System (GPS), Observed Time Difference of Arrival (OTDOA) or Angle of Arrival (AoA), the current location of the client device is determined to be in a same location as a location indicated in the first given event notification preference entry when the current location is within a predetermined radius of the latitude and longitudinal coordinates.

10. The method of claim 1, wherein second information of the given event notification preference entry indicates a first event notification alert setting for a first notification alert to be provided during the event notification alerting, according to at least one of a source or a predetermined priority of the first notification alert.

11. The method of claim 1, further comprising:
controlling, by the processing device,
changing the user alert preference information indicated by the given event notification preference entry to second user alert preference information according to a message from a scheduler tool, in which the message indicates time of day and day of a meeting and whether meeting is onetime or recurring, and
changing the second user alert preference information indicated by the given event notification preference entry to the user alert preference information when an end of the meeting is determined.

12. The method of claim 1, wherein at least one second given event notification preference entry is at least one of (i) selectable for deletion from the memory based on user input via an interface of the client device or (ii) automatically deleted from the memory according to whether the at least one second given event notification preference entry is in the memory for greater than a predetermined time.

13. An apparatus for notification control at a client device in a wireless communication system, the apparatus comprising:
circuitry configured to control:
automatically storing, in a memory of the client device, a given event notification preference entry based on user action to change at least one event notification alert setting,
in which a location of the client device and a time of day and day when the at least one event notification alert setting is changed by the user action are automatically obtained other than from user input via an interface of the client device and associated with the given event notification preference entry, in which the given event notification preference entry indicates user alert preference information indicating the change to the at least one event notification alert setting;
based on a determination whether a current location of the client device matches a given location identifier indicated by a first given event notification preference entry of a plurality of given event notification preference entries stored in the memory, automatically enabling and disabling event notification alerting according to the first given event notification preference information entry; and
when a number of the plurality of given event notification preference entries stored in the memory is determined to be at least a predetermined number, starting the automatically enabling and disabling of the event notification alerting.

14. The apparatus of claim 13,
wherein the automatically storing the given event notification preference entry in the memory and the automatically enabling and disabling the event notification alerting are according to given user input via the interface of the client device.

15. The apparatus of claim 13, wherein the automatically enabling and disabling the event notification alerting is further based on a determination whether a time of day and day when the client device is at the current location matches a given time of day and given day indicated by the first given event notification preference entry.

16. The apparatus of claim 13,
wherein the location of the client device is indicated in the given event notification preference entry by at least one of a Base Station Identity (BSID), a Basic Service Set Identification (BSSID) of an Access Point for a Wireless Local Area Network (WLAN) or a coordinate.

17. The apparatus of claim 13,
wherein the circuitry is configured to control when
(i) the client device is determined to move from a first location to a second location based on a first location identifier of the first location and a second location identifier of the second location, (ii) the event notification alerting is according to a first notification preference entry in the memory indicating the first location and (iii) the second location identifier matches the given location identifier indicated by the first given event notification preference entry,
changing the event notification alerting to be according to the first given event notification preference entry.

18. A wireless communication device comprising:
a receiver to receive a signal of a wireless communication system; and a processing device configured for notification control at the wireless communication device, the processing device configured to control:

automatically storing, in a memory of the wireless communication device, a given event notification preference entry based on user action to change at least one event notification alert setting, in which a location of the client device and a time of day and day when the at least one event notification alert setting is changed by the user action are automatically obtained other than from user input via an interface of the client device and associated with the given event notification preference entry, in which the given event notification preference entry indicates user alert preference information indicating the change to the at least one event notification alert setting;

based on a determination whether a current location of the wireless communication device matches a given location identifier indicated by a first given event notification preference entry of a plurality of given event notification preference entries stored in the memory, automatically enabling and disabling event notification alerting according to the first given event notification preference information entry; and when a number of the plurality of given event notification preference entries stored in the memory is determined to be at least a predetermined number, starting the automatically enabling and disabling of the event notification alerting.

* * * * *